(12) United States Patent
Miyazaki et al.

(10) Patent No.: US 6,455,193 B1
(45) Date of Patent: Sep. 24, 2002

(54) SEALED BATTERY IN WHICH AN ELECTROLYTE-INJECTION HOLE IS FAVORABLY SEALED

(75) Inventors: Noriyuki Miyazaki; Yasuhiro Yamauchi, both of Sumoto (JP)

(73) Assignee: Sanyo Elelctric Co., Inc., Osaka (JP)

( * ) Notice: Subject to any disclaimer, the term of this patent is extended or adjusted under 35 U.S.C. 154(b) by 0 days.

(21) Appl. No.: 09/526,745

(22) Filed: Mar. 16, 2000

(30) Foreign Application Priority Data

Mar. 17, 1999 (JP) .......................................... 11-071864

(51) Int. Cl.$^7$ ................................................ H01M 2/08
(52) U.S. Cl. ........................ 429/185; 429/175; 29/623.2
(58) Field of Search ............................. 429/185; 1/175; 29/623.2

(56) References Cited

U.S. PATENT DOCUMENTS

| | | | | |
|---|---|---|---|---|
| 3,867,201 A | * | 2/1975 | Holmes ....................... 136/114 |
| 4,174,424 A | * | 11/1979 | Jurva et al. ................... 429/90 |
| 4,964,877 A | * | 10/1990 | Keister et al. ............. 29/623.1 |
| 5,004,656 A | * | 4/1991 | Sato et al. .................. 429/162 |
| 5,106,708 A | * | 4/1992 | Bish et al. .................. 429/160 |
| 5,462,820 A | * | 10/1995 | Tanaka ........................ 429/174 |
| 5,693,430 A | * | 12/1997 | Iwatsu et al. .................. 429/72 |
| 6,045,944 A | * | 4/2000 | Okada et al. ................ 429/163 |
| 6,117,586 A | * | 9/2000 | Kim et al. ................... 429/175 |
| 6,132,900 A | * | 10/2000 | Yoshizawa et al. ......... 429/185 |
| 6,168,879 B1 | * | 1/2001 | Kim ............................. 429/61 |

* cited by examiner

Primary Examiner—M. Alexandra Elve
Assistant Examiner—Zidia Pittman
(74) Attorney, Agent, or Firm—Armstrong, Westerman & Hattori, LLP

(57) ABSTRACT

A sealed battery has a generator element enclosed within an external casing. An opening in the external casing is covered by a closure cap in which an injection hole for injecting electrolyte is provided. The injection hole is sealed using a sealing plug which is composed of a support member that is fixed on a surface of the closure cap so as to cover the injection hole and a plugging member that is at least partially formed of an elastic material and is supported by the support member so as to plug the injection hole. The plugging member is formed of an elastic material and is pressed into the injection hole by the support member. As a result, an airtight seal can be easily and securely achieved for the injection hole. The support member can be made large to facilitate handling, thereby reducing the likelihood of the sealing plug being improperly supplied during attachment to the injection hole.

18 Claims, 3 Drawing Sheets

SEALED BATTERY IN WHICH AN ELECTROLYTE-INJECTION HOLE IS FAVORABLY SEALED

This application is based on an application No. 11-71864 filed in Japan, the content of which is hereby incorporated by reference.

BACKGROUND OF THE INVENTION (1) Field of the Invention

The present invention relates to sealed batteries. In particular, the invention relates to a technology for manufacturing a battery where a closure cap is provided in an opening in the external battery casing, with an injection hole provided in the closure cap to allow the injection of electrolyte being sealed using a sealing plug.

(2) Related Art

In recent years, sealed batteries have been widely used as a power source in portable electronic appliances such as mobile telephones, audio-video devices, and computers. Representative sealed batteries include alkaline batteries, such as nickel-hydrogen storage batteries and nickel cadmium storage batteries, and lithium-ion batteries.

Both cylindrical and rectangular sealed batteries are widely used, with rectangular batteries being subject to special attention due to their superior space-saving potential when used in portable devices.

Sealed batteries are constructed as follows. A generator element is formed by impregnating a set of positive and negative electrodes with an electrolyte. This generator element is placed inside an external casing composed of a metal cylinder. An opening in the metal casing is sealed using a closure cap, with the edges of the closure cap and the metal casing being hermetically sealed to prevent the leakage of electrolyte or gas. This seal is often formed by a mechanical calking method, though in the case of rectangular sealed batteries, laser welding is also commonly used.

As part of the manufacturing, the set of electrodes needs to be impregnated with the electrolyte. One common method of doing so inserts the electrode group into the metal casing before injecting electrolyte into the metal casing and sealing the battery with a closure cap. However, when the seal between the closure cap and the edges of the opening in the external casing is formed using laser welding, there are many cases where a proper seal cannot be formed due to electrolyte adhering to the parts subjected to welding.

In view of this problem, Japanese Laid-Open Patent Application No. H11-025936 teaches the following technology. A small injection hole, with a diameter in the region of 1–2 mm, is formed in the closure cap to allow electrolyte to be injected into the battery. The opening in the metal casing is first sealed using the closure cap before the electrolyte is injected into the injection hole using a nozzle. After this, the injection hole is sealed using a sealing plug which is laser welded to the closure cap to seal the battery.

With the above method, the closure cap is laser welded over the opening in the external casing before the electrolyte is injected into the battery, so that there are no imperfections in the seal due to electrolyte adhering to the welded parts. However, there is still the possibility of the electrolyte adhering to the sealing plug that is used to fill the injection hole. When laser welding the sealing plug to the closure cap, the welding needs to precisely follow the external circumference of the sealing plug. However, if electrolyte adheres to the edge of the injection hole, spattering will occur during welding, causing imperfections in the weld. This is a common problem.

In keeping with the small size of the injection hole, the sealing plug that seals the injection hole needs to be minute, which makes the plug difficult to handle and to insert into the injection hole during manufacturing. This also constitutes a problem for battery manufacturers.

SUMMARY OF THE INVENTION

It is a primary object of the present invention to provide a technique which, in the manufacture of sealed batteries, (a) reduces the occurrence of defective seals for an injection hole provided in a closure cap during and (b) facilitates the sealing process.

In order to achieve the stated object, the present invention forms a sealing plug for sealing an injection hole provided in the closure cap of a sealed battery from a support member and a plugging member. The support member is fixed on a surface of the closure cap so as to cover the injection hole. The plugging member is at least partially formed of an elastic material and is supported by the support member so as to plug the injection hole.

When an injection hole is sealed using this kind of sealed plug, the elastic plugging member of the sealing plug is supported by the support member so as to plug the injection hole, forming an airtight seal. The support member is attached to the closure cap without the join between them needing to be airtight, so that batteries can be securely and easily sealed in this way.

When electrolyte adheres to the rim of the injection hole, this does not pose a problem to the process, such as welding, used to attach the support member to the closure cap.

This means that the present invention does not suffer from defective seals, even when electrolyte is present at the rim of the injection hole.

While the plugging member of present sealing plug can be made small in accordance with the size of the injection hole, the support member can be made quite large to facilitate the handling of the sealing plug. As a result, misalignments of the sealing plug with the injection hole during manufacturing can also be avoided.

The present sealing plug may use a flat plate as a support member, to which an elastic material can be applied to form the plugging member. This makes the sealing plug relatively easy to manufacture.

The width of the base part of the plugging member can be made larger than the diameter of the injection hole to securely seal the part. When doing so, it is preferable to form a recess in the closure cap around the injection hole to accommodate the base part of the plugging member.

The support member can be easily attached to the closure cap by forming the outer edges of the support member so as to reach the edges of the closure cap. This enables the edges of the support member to be welded to the edges of the closure cap.

More preferably, the outer edges of the closure cap will be turned up so as to facilitate welding of the edges to the edges of the support member.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

Overall Construction of the Battery

Figure 1:
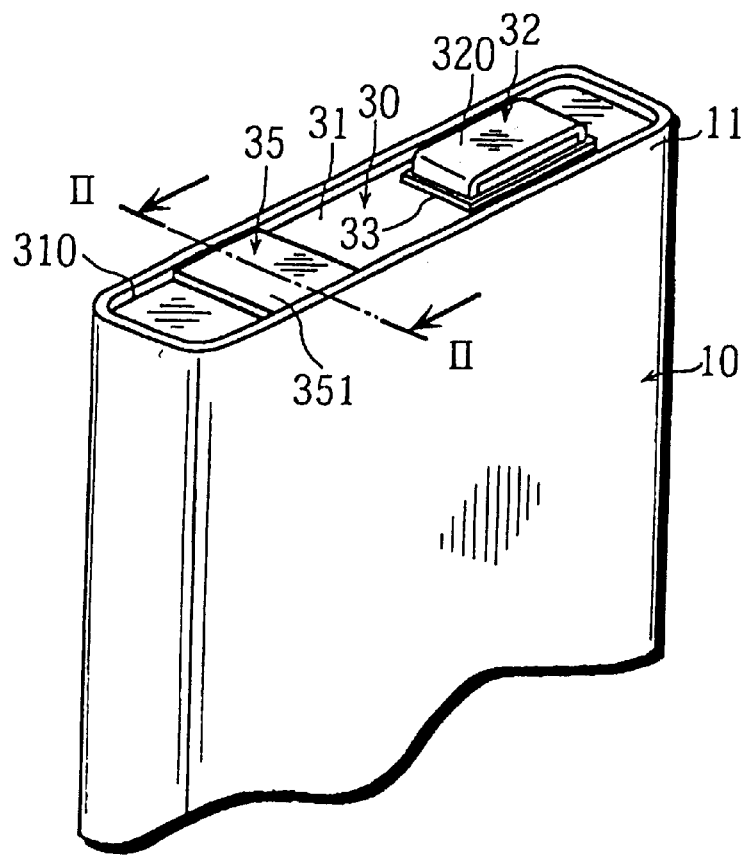
FIG. 1 is a perspective view of a rectangular sealed battery that is an embodiment of the present invention.
Figure 2:
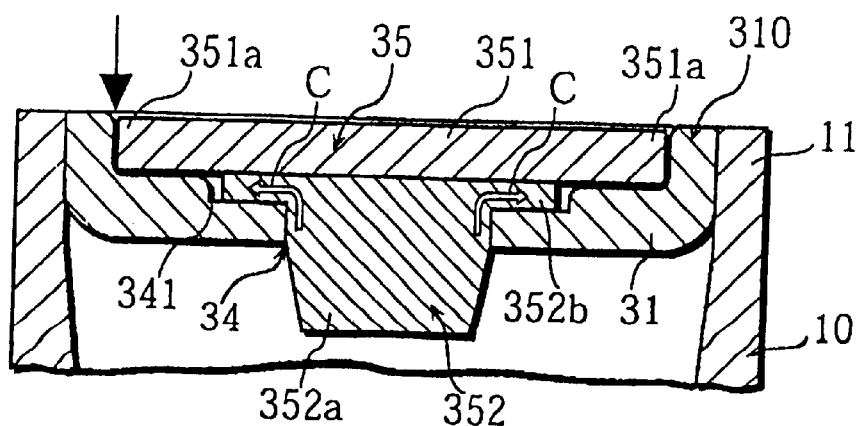
FIG. 2 shows a cross-section of the battery taken along the line A–A' given in FIG. 1.

FIG. 1 is a perspective view of a rectangular sealed battery that is an embodiment of the present invention. FIG. 2 shows a cross-section of the battery taken along the line A–A' given in FIG. 1.

The present rectangular sealed battery is a secondary lithium cell. A generator element, in which spirally wound electrodes (not illustrated) have been impregnated with non-aqueous electrolyte, is enclosed in an external casing 10 that is a rectangular cylinder with a closed bottom. The opening in the external casing 10 is covered by the closure construction 30.

The external casing 10 is formed from an Al—Mn* type alloy plate in the shape of a rectangular cylinder with a closed bottom. The principle metal in the Al—Mn type alloy is aluminum to make the battery is light, while the addition of manganese gives the casing a higher tensile strength than if aluminum were used alone.

As shown in FIG. 1, the closure construction 30 has a sealing plate 31 that is shaped so as to fit into the opening in the external casing 10. The negative electrode terminal 32 is formed so as to pass through the sealing plate 31, with an insulating gasket 33 being provided so as to separate the sealing plate 31 and the negative electrode terminal 32.

The sealing plate 31 is made of a plate of the same Al—Mn alloy as the external casing 10 and in the same rectangular shape as the opening in the external casing 10. Turned-up ridges 310 that curve toward the outside of the battery are provided at the outer edge of the sealing plate 31. These turned-up ridges 310 are sealed to the aperture edges 11 of the opening in the external casing 10 by laser welding.

To maximize the inner volume of the cell, the external casing 10 and sealing plate 31 should be made as thin as possible within a range where adequate strength can be maintained. The thickness of the external casing 10 is usually set at around 0.5 mm, while the thickness of the sealing plate 31 is usually set at around 0.8 mm. The sealing plate 31 is made slightly thicker than the external casing 10 so as to prevent the sealing plate 31 from becoming misshapen when the negative electrode terminal 32 is attached to the sealing plate 31.

The negative electrode terminal 32 is provided in the shape of a rivet with a cap 320 and a shaft. A safety valve mechanism is provided in the cap 320.

The negative electrode terminal 32 is fitted into a through hole provided in the sealing plate 31 via the gasket 33, and is fixed to the sealing plate 31 by having the bottom part of the shaft crimped to the sealing plate 31.

An injection hole 34 is provided in the sealing plate 31 and is closed by the sealing plug 35. This injection hole 34 and sealing plug 35 are described in detail later.

The internal construction of the battery is not illustrated, but is composed of a set of spirally wound electrodes. This set of electrodes is produced by laminating a negative and positive electrode plates with a separator in between, before rolling the laminated plates into a cylindrical shape with an ovoid cross-section.

The negative electrode plate is produced by applying layered carbon (powdered graphite) onto a plate-like core, and is electrically connected to the negative electrode terminal 32 via a lead plate. On the other hand, the positive electrode plate is formed by applying a positive electrode mixture composed of (a) a composite oxide including lithium (such as lithium cobalt oxide) as the active material for the positive electrode and (b) a conductive agent (such as acetylene black) onto a plate-like core. The positive electrode plate is directly connected to the external casing 10 that also serves as the positive electrode terminal.

As one example, the electrolyte that is used to impregnate the electrode construction can be produced by dissolving an $LiPF_6$ solute in a mixed solvent composed of ethylene carbonate and dimethyl carbonate.

An insulating sleeve composed of an insulating resin is provided between the electrode construction and the sealing plate 31 to stop the electrode construction and the sealing plate 31 coming into contact.

Injection Hole And Sealing Plug

The injection hole 34 is a hole with a diameter of around 1–2 mm.

As shown in FIG. 2, the sealing plug 35 is composed of a flat pressing plate 351 that has a protruding member 352 formed on its surface (in FIG. 2, the lower surface) This protruding member 352 is made from an elastic material.

The pressing plate 351 is attached to the outer surface (in FIG. 2, the upper surface) of the sealing plate 31 so as to cover the injection hole 34, with the protruding member 352 being inserted into the injection hole 34 and supported in this inserted position by the pressing plate 351.

It is desirable for the pressing plate 351 to be formed from a material that is sufficiently hard to press the protruding member 352 into the injection hole 34, but at the same time can be easily welded to the sealing plate 31. As one example, the pressing plate 351 can be manufactured from the same aluminum alloy as the sealing plate 31.

It is desirable for the protruding member 352 to be formed from an elastic material that is resistant to the electrolyte and can withstand rises in temperature that occur during normal use of the battery. As one example, EP rubber may be used.

In more detail, the pressing plate 351 is a rectangular plate that is slightly narrower than the sealing plate 31 in the horizontal direction in FIG. 2, this direction hereafter being referred to as "horizontal". The horizontal edges 351a on both sides of the pressing plate 351 are laser welded to the turned-up ridges 310 with the pressing plate 351 fitted into the sealing plate 31 at a position where the surface of the sealing plate 31 covers the injection hole 34.

The following describes the shape of the protruding member 352 in detail.

The protruding member 352 is shaped like a hat and is composed of a central pillar 352a and a base 352b. The central pillar 352a is cylindrical with a diameter that is roughly equal to that of the injection hole 34, and is slightly tapered. The bottom part of the central pillar 352a has a diameter that is slightly larger than that of the injection hole 34. On the other hand, the base 352b has a larger diameter than the central pillar 352a.

A recess 341 is formed around the injection hole 34 in the outer surface of the sealing plate 31 so as allow the base 352b to be inserted. This recess 341 is made slightly higher than the height of the base 352b.

When a sealing plug 35 with a protruding member 352 formed in the described shape is inserted into the injection hole 34, the external circumference of base part of the central pillar 352a presses against the inner surface of the injection hole 34, sealing that part of the battery. The surface of the base 352b of the protruding member 352 presses against the recess 341 and seals that part. As a result, a strong hermetic seal is formed between the protruding member 352 and the injection hole 34.

Manufacturing Method for the Battery

The following describes the manufacturing method used to produce the rectangular sealed battery described above.

The external casing 10 can be made by subjecting a flat plate of an Al—Mn alloy to a deep drawing process to produce a rectangular cylinder with a closed bottom.

The sealing plate 31 is made in the following way. A flat plate of an Al—Mn alloy is subjected to a deep drawing process to produce the turned-up ridges 310 and the concave that corresponds to the recess 341 is produced by a forging process. The through hole for the negative electrode terminal and the injection hole 34 are stamped out of the plate and the resulting sealing plate 31 is then stamped out along the edges of the turned-up ridges 310.

The closure construction 30 is formed by fitting the gasket 33 and the negative electrode terminal 32 into the sealing plate 31 and then crimping the negative electrode terminal 32 to the sealing plate 31.

The spirally wound electrodes are produced by laminating a belt-like negative electrode that has an attached lead plate, a belt-like separator and a belt-like positive electrode, before winding the laminated electrodes into a cylinder shape. The resulting cylinder is then placed on its side and flattened to give a cylinder with an ovoid cross-section.

The sealing plug 35 is manufactured as follows.

The pressing plate 351 can be produced by stamping out an appropriate-sized piece from an aluminum alloy plate. A resinous material is then used to form the protruding member 352 on one surface of the pressing plate 351 to complete the sealing plug 35.

In more detail, crude EP rubber can be formed in the shape of the protruding member 352 and is then vulcanized, before being attached to the pressing plate 351 using an adhesive. As another alternative, crude EP rubber can be formed in the shape of the protruding member 352 on the surface of the pressing plate 351 and then vulcanized.

The following describes how the battery is assembled from the external casing 10, the closure construction 30 (minus the sealing plug 35 at this stage), the set of electrodes and the sealing plug 35 that are manufactured as described above.

The electrode construction is inserted into the external casing 10 and the negative electrode lead plate is passed through the insulating sleeve and electrically connected to the negative electrode terminal 32.

Next, the insulating sleeve and the closure construction 30 are pressed into the opening in the external casing 10, and the turned-up ridges 310 of the closure construction 30 and the aperture edges 11 of the external casing 10 are welded together by having a laser beam scan around their edges.

If laser welding is performed with no turned-up ridges 310 having been formed at the edge of the sealing plate 31, there would be a considerable flow of heat from the welded parts towards the center of the sealing plate 31. Such dissipation results in the laser part applying less energy to the welded parts which become susceptible to cracking. In the present embodiment, however, turned-up ridges 310 are formed in the sealing plate 31, so that when laser welding is performed, there is no linear path from the welded parts to the center of the sealing plate. This reduces the dissipation of heat from the welded parts, which reduces the thermal stress that is produced there. As a result, cracking can be suppressed at the welded join, even when the power of the laser beam is reduced.

Non-aqueous electrolyte is next injected into the external casing 10 via the injection hole 34 using an electrolyte-injecting nozzle.

Finally, the sealing plug 35 is attached over the injection hole 34 so that the protruding member 352 is pressed into the injection hole 34. The sealing plug 35 is fixed by laser welding the horizontal edges 351a on both sides of the pressing plate 351 to the turned-up ridges 310. When this laser welding is performed, it is preferable for an external force to be applied so as to press the pressing plate 351 onto the sealing plate 31.

Effects of the Sealing Method Used in the Present Embodiment

Figure 3:
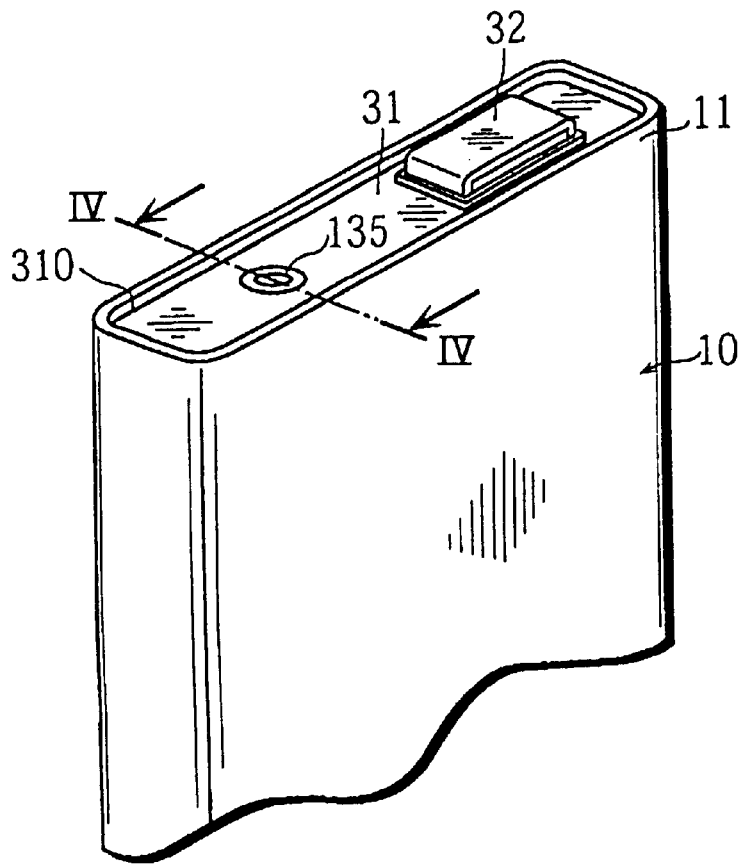
FIG. 3 is a perspective view of a rectangular sealed battery that is a comparative example.
Figure 4:
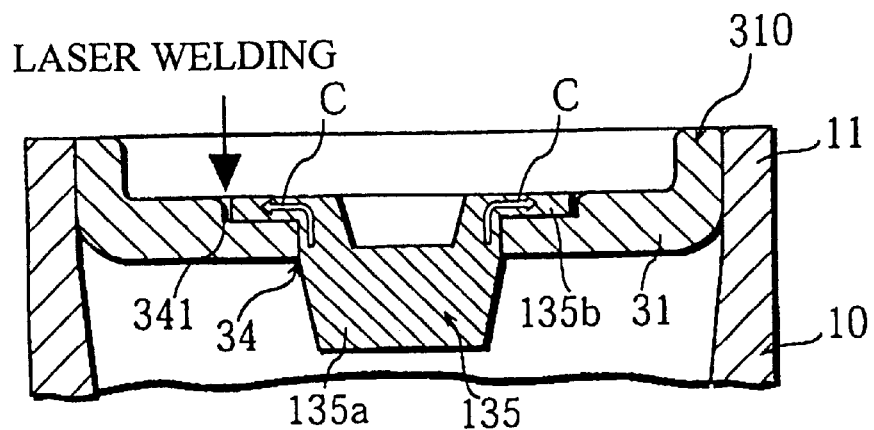
FIG. 4 shows a cross-section of the battery taken along the line A–A' given in FIG. 3.

The following describes the effects of the sealing method used in the present embodiment by comparing it with the comparative example shown in FIGS. 3 and 4. This comparative example is described in detail later in this specification, but fundamentally has the injection hole 34 sealed with a sealing plug 135 that is entirely formed of an aluminum alloy and has a diameter that is substantially equal to the diameter of the injection hole 34.

In both the present embodiment and in the comparative example, non-aqueous electrolyte is injected into the external casing 10 via the injection hole 34 before the injection hole 34 is sealed by inserting a sealing plug that is then laser welded to the battery. However, when this laser welding is performed, non-aqueous electrolyte is often present on the rim of the injection hole 34.

When the sealing plug 135 of the comparative example is used, the edge between the sealing plug 135 and the injection hole 34 needs to be airtight during the laser welding for a favorable welded seal to be achieved. If non-aqueous electrolyte is present at the rim of the injection hole 34, the insertion of the sealing plug 135 to the injection hole 34 is likely to press the non-aqueous electrolyte present at the rim up (i.e., in the direction shown by the white arrows C in FIGS. 2 and 4) between the base 135b and the recess 341 that are to be welded together. This results in spattering during the laser welding, which can lead to a defective seal being made.

On the other hand, when the sealing plug 35 of the present embodiment is inserted into the injection hole 34 and the pressing plate 351 is welded to the sealing plate 31, the protruding member 352 is pressed by the pressing plate 351 into the injection hole 34, forming an airtight seal between the protruding member 352 and the injection hole 34. Even if the laser welding of the pressing plate 351 to the sealing plate 31 does not achieve an airtight seal, the injection hole 34 will still be sealed by the protruding member 352 pressing against the injection hole 34, so that the presence of electrolyte at the parts subjected to laser welding will not result in the battery having a defective seal.

Since the parts subjected to laser welding are positioned at some distance from the injection hole 34 in the present embodiment, it is unlikely that non-aqueous electrolyte present at the rim of the injection hole 34 will be pushed up as far as the welded parts. This means that welding defects are unlikely to occur due to the presence of non-aqueous electrolyte.

By using the sealing plug 35 described in the present embodiment, the injection hole 34 can be easily and securely sealed.

When the sealing plug 135 of the comparative example is used, it becomes necessary to weld around the edge of the injection hole 34. With the present embodiment, however, the horizontal edges 351a on both sides of the pressing plate 351 are welded to the turned-up ridges 310 to fix the sealing plate 31 to the pressing plate 351.

Since it is easier to shine a laser beam on the edges of a sealing plate than on the center, laser welding can be performed more easily for the present embodiment than for the comparative example.

It is desirable for the axis of the laser beam to be perpendicular to the surface of the welded parts (i.e., for the height of the welded surface to be constant).

In the comparative example, a recess 341 needs to be formed for the base 135b of the sealing plate to fit into so that the height of the surface that is incident to the laser beam is constant. In the present embodiment, setting the height of the turned-up ridges 310 roughly equal to the thickness of the pressing plate 351 makes the height of the turned-up ridges 310 equal to the height of the horizontal edges 351a, so that keeping the height of the incident surface constant is relatively easy.

As a further effect of the present embodiment, the sealing plug is easier to handle and to attach to the battery. This is described in more detail below.

The sealing plug 135 of the comparative example has a small diameter that is roughly equal to the diameter of the injection hole 34. This makes it difficult to properly insert the sealing plug 135 into the injection hole 34 during actual manufacturing. Problems may still arise even if the sealing plug 135 is placed on a suction pad, for example, before being moved to and inserted into the injection hole 34.

On the other hand, the sealing plug 35 of the present embodiment is constructed with the pressing plate 351 having almost the same width as the battery itself. This makes it easy to attach the sealing plug 35 to a suction pad and to correctly position and attach the sealing plug 35.

In this way, problems regarding the attachment of the sealing plug are reduced when the sealing plug 35 of the present embodiment is used.

Possible Modifications and Other Comments

The sealing plug 35 of the present embodiment was described as having a protruding member 352 that is entirely formed of an elastic material, though only part of such protruding member 352 may be formed of an elastic material.

As one example, only the central pillar 352a of the protruding member 352 maybe formed of an elastic material, with the base 352b being formed of a rigid material. Alternatively, the central pillar 352a of the protruding member 352 may be formed of a rigid material, with only the base 352b of the protruding member 352 being formed of an elastic material.

In order to achieve a favorable seal, however, the surface of the protruding member 352 should preferably be formed of an elastic material. This means that either the entire protruding member 352 should preferably be formed of an elastic material as described above, or the inner core of the protruding member 352 should be formed of a rigid material with the surface of the protruding member 352 being formed of an elastic material.

In the present embodiment, the pressing plate 351 is attached to the sealing plate 31 by performing the relatively easy process of laser welding the horizontal edges 351a of the pressing plate 351 and the turned-up ridges 310. However, any parts of the sealing plate 31 and the outer edges of the pressing plate 351 maybe welded.

In the present embodiment, the pressing plate 351 is described as being a rectangular plate, though the pressing plate 351 can be any shape, such as circular.

In the present embodiment, the pressing plate is described as being made of the same aluminum alloy as the sealing plate to facilitate the laser welding of the pressing plate and the sealing plate. However, the sealing plate need not be made of the same material as the sealing plate.

In the present embodiment, the external casing and sealing plate are described as being made of aluminum alloy, though the present invention can still be achieved if stainless steel or another material is used. As stated above, it is preferable for the pressing plate to the made of the same material (stainless steel, etc.) as the sealing plate.

The pressing plate 351 needs to be fixed only the surface of the sealing plate 31 so as to cover the injection hole 34 and to press the protruding member 352 into the injection hole 34 to properly function as a supporting member in the sealing plug 35. While it is thought that a plate-like shape will be advantageous, the pressing plate 351 does not have be plate-like, so that the sealing plug can be produced with a rod-like supporting member, for example.

The present embodiment describes the case for a lithium secondary cell, although the present invention can be used for any cell that uses a non-aqueous electrolyte, such as nickel hydride or any other alkaline cell. The present invention is neither limited to secondary cells, and so may be used for primary cells as well.

Finally, while the present embodiment describes a rectangular sealed battery, the present invention can also be applied to a cylindrical sealed battery.

Actual Example

A rectangular sealed battery was produced In accordance with the above embodiment. This battery was 48 mm high, 30 mm wide and 10 mm thick.

The sealing plate 31 was made from a 0.8 mm thick plate of aluminum alloy, and the diameter of the injection hole 34 was 1.6 mm.

Figure 5A:
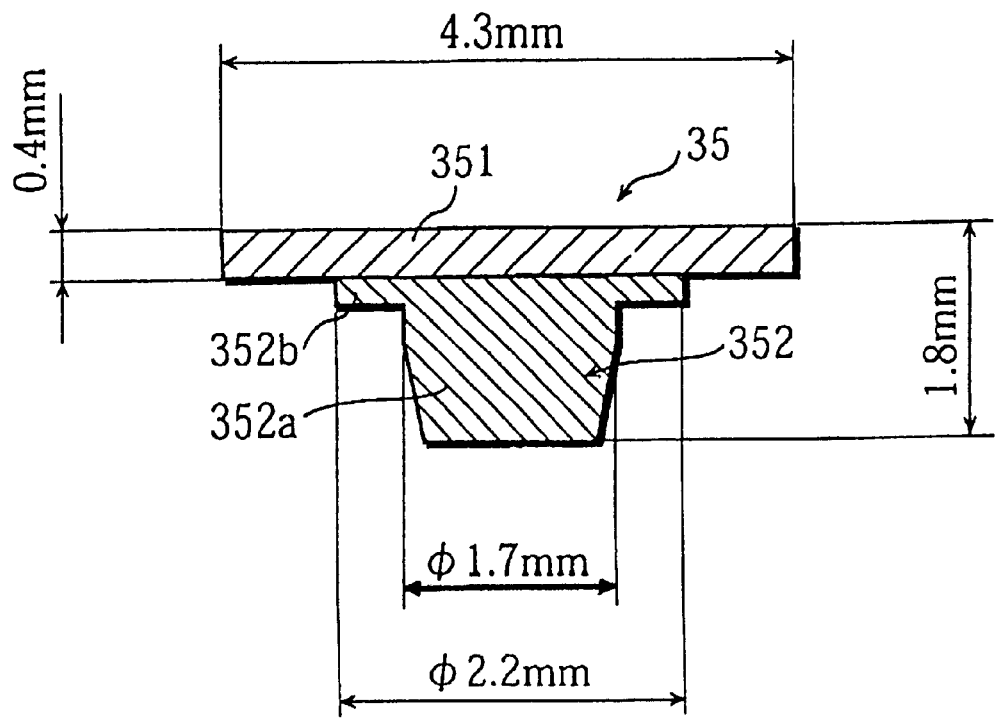
FIGS. 5A and 5B show the sizes of the sealing plugs used in an actual example of the present invention and the comparative example, respectively.

The dimensions of the sealing plug 35 were as shown in FIG. 5A, so that its overall height was 1.8 mm, the pressing plate 351 was 4.3 mm wide and 0.4 mm thick, the diameter of the central pillar 352a of the protruding member 352 was 1.7 mm at the widest part, and the diameter of the base 352b was 2.2 mm.

Comparative Example

FIG. 3 is a perspective view of a conventional rectangular sealed battery that was used as a comparative example. FIG. 4 shows a cross-section of this battery taken along the line A–A' shown in FIG. 3.

Construction elements in FIGS. 3 and 4 that have been given the same numerals as those used in FIGS. 1 and 2 are the same as the aforementioned components that have these numerals.

The rectangular sealed battery of the comparative example differs from the actual example of the present embodiment in the method used to seal the injection hole 34.

In more detail, the comparative example uses a sealing plug 135 that has substantially the same diameter as the injection hole 34 and is entirely formed of an aluminum alloy to seal the injection hole 34, in place of the sealing plug 35 of the present embodiment.

The sealing plug 135 has the same shape as the protruding member 352 of the sealing plug 35 of the present embodiment, and so is composed of a protruding member 135a that fits into the injection hole 34 and base 135b that has a larger diameter than the protruding member 135a and fits into the recess 341.

The outer circumference of the base 135b of the sealing plug 135 is laser welded to the recess 341 in the sealing plate 31 to seal the injection hole 34.

The sizes of the sealing plate 31 and the injection hole 34 are the same as described for the actual example of the present invention.

Figure 5B:
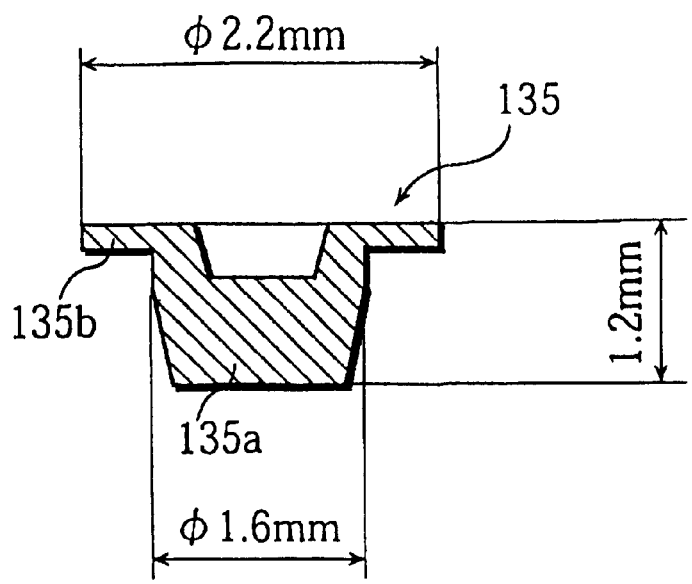

The sealing plug 135 has the dimensions shown in FIG. 5B, which is to say that the overall height is 1.2 mm, the diameter of the protruding member 135a is 1.6 mm at the widest part, and the diameter of the base 135b is 2.2 mm.

Experiment

The actual example of the present invention and the comparative example described above were manufactured on an production line. The leak ratio for the injection hole 34 and defective attachment ratio for the sealing plug were measured for both types of battery.

On the production line, the sealing plug was inserted into the sealing plug 135 by continuously sliding sealing plugs 35 or sealing plugs 135 along rails to a predetermined position, where one sealing plug (35 or 135) was lifted using a suction pad and then inserted into the injection hole 34. Laser welding was then performed only on the batteries where the sealing plug had been correctly inserted into the injection hole 34.

The batteries that were consecutively produced by the manufacturing methods of the actual example of the present invention and the comparative example were then left to age.

The leak ratio was measured as the proportion of batteries where electrolyte leaked out the gap between the injection hole 34 and the sealing plug during the ageing process.

The defective attachment ratio was measured as the proportion of batteries where the sealing plug was not properly inserted into the injection hole 34 when the injection hole 34 was sealed.

The results of this experiment are shown in Table 1 below.

TABLE 1

|  | actual example | comparative example |
|---|---|---|
| leak ratio | 0.75% | 21.82% |
| defective attachment ratio | 0.15% | 5.30% |

As can be seen from Table 1, the batteries of the actual example of the present invention have a much lower leak ratio and defective attachment ratio to the batteries of the comparative example.

The low leak ratio of the batteries of the actual example show that defective seals between the injection hole 34 and the sealing plug 35 are rare.

The high defective attachment ratio of the batteries of the comparative example was caused by a supply problem whereby the continuous supplying of sealing plugs 135 on rails causes the sealing plugs 135 to jam. The low defective attachment ratio of the batteries of the actual example of the present invention is due to the favorable continuous supply of the sealing plugs 35 to the predetermined position.

As described above, when an injection hole provided in the closure cap of a sealed battery is sealed according to the present invention, the seal can be easily and properly formed. It is also possible to reduce the number of defective attachments that occur when attaching sealing plugs to injection holes during the actual manufacturing process. This means that the present invention constitutes a significant improvement in the efficient production of sealed batteries.

Although the present invention has been fully described by way of examples with reference to the accompanying drawings, it is to be noted that various changes and modifications will be apparent to those skilled in the art. Therefore, unless such changes and modifications depart from the scope of the present invention, they should be constructed as being included therein.

What is claimed is:

1. A sealed battery having a generator element, an external casing, a closure cap, and a sealing plug, the generator element being inserted into the external casing, an opening in the external casing being covered by the closure cap in which an injection hole for injecting an electrolyte is provided, and the injection hole being sealed using the sealing plug, the sealing plug comprising:
a support member that is fixed on a surface of the closure cap so as to cover the injection hole; and
a plugging member that is at least partially formed of an elastic material and is supported by the support member so as to plug the injection hole.

2. A sealed battery according to claim 1,
wherein the support member is a flat plate that is welded to the closure cap and the plugging member projects outward from a surface of the support member.

3. A sealed battery according to claim 2,
wherein the support member is formed of a same type of material as the closure cap.

4. A sealed battery according to claim 1,
wherein the plugging member is at least partially made of rubber that is resistant to the electrolyte.

5. A sealed battery according to claim 1,
wherein the sealed battery is rectangular.

6. A sealed battery according to any of claims 1 to 5,
wherein the support member has edges that extend as far as edges of the closure cap.

7. A sealed battery according to claim 6,
wherein the closure cap has external edges that are upturned, and the support member is welded to the external edges of the closure cap.

8. A sealed battery according to any of claims 1 to 5,
wherein the plugging member has a base that is wider than the injection hole.

9. A sealed battery according to claim 8,
wherein the plugging member has a base that is wider than a projecting part of the plugging member.

10. A sealed battery according to claim 8,
wherein the closure cap is formed with a concave part around the injection hole, the concave part being shaped so as to accommodate the base of the plugging member.

11. A sealing plug for sealing an injection hole provided in a closure cap of a sealed battery, the injection hole being used for injecting electrolyte into the sealed battery, the sealing plug comprising:

a support member that is fixed at a position on a surface of the closure cap so as to cover the injection hole; and a plugging member that is at least partially formed of an elastic material and is supported by the support member so as to plug the injection hole.

12. A sealing plug according to claim 11, wherein the support member is a flat plate and the plugging member projects outward from a surface of the support member.

13. A sealing plug according to claim 12, wherein the support member is made of sheet metal.

14. A sealing plug according to claim 11, wherein the plugging member is at least partially made of rubber that is resistant to the electrolyte.

15. A sealing plug according to any of claims 11–14, wherein the plugging member has a base that is wider than the injection hole.

16. A sealing plug according to any of claims 11–14, wherein the plugging member has a base that is wider than a projecting part of the plugging member.

17. A sealing method for sealing an injection hole provided in a closure cap of a sealed battery, the injection hole being used for injecting electrolyte into the sealed battery, the sealing method comprising:

a sealing plug preparation step for preparing a sealing plug composed of a support member and a plugging member that is at least partially formed of an elastic material and is supported by the support member;

a sealing plug attaching step for attaching the support member to a surface of the closure cap so as that the support member covers the injection hole and presses the plugging member into the injection hole.

18. A sealing method according to claim 17, wherein the sealing plug attaching step attaches the support member to the closure cap by welding.

* * * * *